(12) United States Patent
Smith et al.

(10) Patent No.: US 11,523,563 B2
(45) Date of Patent: *Dec. 13, 2022

(54) BALE WRAP CUTTING AND RETAINING APPARATUS

(71) Applicant: TIE DOWN, INC., Atlanta, GA (US)

(72) Inventors: Russell Smith, Hiram, GA (US); Travis Turner, East Point, GA (US)

(73) Assignee: Tie Down, Inc., Atlanta, GA (US)

( * ) Notice: Subject to any disclaimer, the term of this patent is extended or adjusted under 35 U.S.C. 154(b) by 562 days.

This patent is subject to a terminal disclaimer.

(21) Appl. No.: 16/545,745

(22) Filed: Aug. 20, 2019

(65) Prior Publication Data
US 2021/0051857 A1 Feb. 25, 2021

(51) Int. Cl.
| | |
|---|---|
| *A01D 87/12* | (2006.01) |
| *A01F 29/00* | (2006.01) |
| *A01F 29/08* | (2006.01) |
| *A01F 29/09* | (2010.01) |
| *A01D 90/04* | (2006.01) |

(52) U.S. Cl.
CPC .......... *A01F 29/005* (2013.01); *A01D 87/127* (2013.01); *A01D 90/04* (2013.01); *A01F 29/08* (2013.01); *A01F 29/095* (2013.01); *A01D 2087/128* (2013.01)

(58) Field of Classification Search
CPC .................. A01D 87/127; A01D 90/04; A01D 2087/128; A01F 29/005; A01F 29/08; A01F 29/095
USPC .................................................. 83/769, 773
See application file for complete search history.

(56) References Cited

U.S. PATENT DOCUMENTS

| | | | | |
|---|---|---|---|---|
| 1,697,497 | A | * | 1/1929 | Drusch .................. B27B 19/00 83/761 |
| 3,016,933 | A | * | 1/1962 | Keesling .............. B23D 59/002 144/35.1 |
| 3,612,127 | A | | 10/1971 | Benno |
| 4,411,573 | A | | 10/1983 | Townsend |
| 4,449,672 | A | | 5/1984 | Morlock et al. |
| 4,497,163 | A | | 2/1985 | Ogman |
| 4,549,481 | A | | 10/1985 | Groeneveld et al. |
| 4,597,703 | A | | 7/1986 | Bartolini |
| 4,771,670 | A | | 9/1988 | Woerman |
| 4,923,128 | A | | 5/1990 | Ostrowski |
| 4,996,899 | A | | 3/1991 | Henderson |
| 5,033,683 | A | | 7/1991 | Taylor |
| 5,161,448 | A | | 11/1992 | Wangsness |
| 5,242,121 | A | | 9/1993 | Neier |
| 5,542,326 | A | | 8/1996 | Borgford |

(Continued)

OTHER PUBLICATIONS

Van Nus, Warren; Notice of Allowance for U.S. Appl. No. 15/932,325, filed Feb. 16, 2018, dated Aug. 25, 2020, 7 pgs.
Van Nuss, Warren; Requirement for Restriction/Election for U.S. Appl. No. 15/932,325, filed Feb. 16, 2018, dated Mar. 5, 2020, 6 pgs.

(Continued)

*Primary Examiner* — Lynn E Schwenning
(74) *Attorney, Agent, or Firm* — Taylor English Duma LLP

(57) ABSTRACT

Example aspects of a wrap cutting assembly for a bale wrap and a method for using a bale wrap cutting and retaining apparatus are disclosed. The wrap cutting assembly can comprise a saw housing defining a connection portion; a saw comprising a plurality of teeth configured to cut the bale wrap; and a linkage system movably coupling the saw to the saw housing and configured to move the saw along an arcuate path.

15 Claims, 12 Drawing Sheets

(56) References Cited

U.S. PATENT DOCUMENTS

| | | | |
|---|---|---|---|
| 5,544,822 | A | 8/1996 | Neier |
| 5,957,025 | A | 9/1999 | Buckmaster et al. |
| 7,377,457 | B2 | 5/2008 | Schierman |
| 7,967,231 | B2 | 6/2011 | Post et al. |
| 8,261,455 | B2 * | 9/2012 | Henrickson ............... B25F 3/00 |
| | | | 30/394 |
| 8,528,843 | B2 * | 9/2013 | Murphy ............... A01D 87/127 |
| | | | 241/30 |
| 10,506,763 | B2 * | 12/2019 | Sargent ............... A01D 87/127 |
| 10,647,463 | B2 | 5/2020 | Steenhoek et al. |
| 10,863,677 | B2 * | 12/2020 | van Nus ................ B26D 5/12 |
| 2008/0041989 | A1 | 2/2008 | Schierman |
| 2011/0155830 | A1 | 6/2011 | Murphy |
| 2013/0149082 | A1 * | 6/2013 | Sheedy ............... A01D 87/127 |
| | | | 414/412 |
| 2013/0193247 | A1 | 8/2013 | Graham |
| 2017/0042094 | A1 | 2/2017 | Sargent et al. |
| 2018/0016049 | A1 * | 1/2018 | Schmitz ............. B65B 69/0033 |
| 2018/0220586 | A1 | 8/2018 | Van Nus et al. |

OTHER PUBLICATIONS

Van Nuss, Warren; Non-Final Office Action for U.S. Appl. No. 15/932,325, filed Feb. 16, 2018, dated May 21, 2020, 28 pgs.

Sargent, Kenneth A.; Supplemental Notice of Allowance for U.S. Appl. No. 15/233,626, filed Aug. 10, 2016, dated Nov. 4, 2019, 6 pgs.

Sargent, Kenneth A.; Non-Final Office Action for U.S. Appl. No. 15/233,626, filed Aug. 10, 2016, dated Mar. 20, 2019, 17 pgs.

Sargent, Kenneth A.; Notice of Allowance for U.S. Appl. No. 15/233,626, filed Aug. 10, 2016, dated Jul. 29, 2019, 5 pgs.

Tanco Autowrap; Brochure for 170 Bale Shear, publicly available prior to Aug. 11, 2015, 2 pgs.

Tanco Autowrap; Brochure for 173 Bale Shear, publicly available prior to Aug. 11, 2015, 2 pgs.

Tanco Autowrap; Brochure for Bale Feeding Solutions, publicly available prior to Feb. 19, 2018, 2 pgs.

Tanco Autowrap; Brochure for Multi Shear, publicly available prior to Feb. 19, 2018, 3 pgs.

Tanco Autowrap; Website for Tanco Autowrap, located at <https://itanco.com/iseries/>, accessed on Jan. 11, 2018, 12 pgs.

* cited by examiner

BALE WRAP CUTTING AND RETAINING APPARATUS

TECHNICAL FIELD

This disclosure relates to agricultural products. More specifically, this disclosure relates to an apparatus for cutting and retaining a bale wrap of an agricultural bale.

BACKGROUND

Bales comprising agricultural material, such as hay, straw, or corn stalk, are often covered, wrapped, collected, or bound with a bale wrap. The bale wrap must be cut to release the agricultural material. However, the bales can be heavy and difficult to maneuver and the bale wrap can be difficult to remove, even once cut. Moreover, the bale wraps are often manually cut using a knife, which can be strenuous and dangerous for the operator of the knife. Animals are also often nearby to the bale, and it can be desired to distance the animals from both the knife and the bale wrap after it has been cut away from the agricultural material for their safety.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is a wrap cutting assembly can comprising a saw housing defining a connection portion; a saw comprising a plurality of teeth configured to cut the bale wrap; and a linkage system movably coupling the saw to the saw housing and configured to move the saw along an arcuate path.

Also disclosed is a bale wrap cutting and retaining apparatus comprising a frame; a first arm mounted to the frame; a second arm mounted to the frame, the first arm and second arm defining a bay therebetween configured to receive the bale; a wrap cutting assembly configured to cut a bale wrap of the bale, the wrap cutting assembly mounted to the first arm and comprising a saw configured to move relative to the first arm; and a wrap retaining assembly configured to retain the bale wrap of the bale.

Also disclosed is a method for using a bale wrap cutting and retaining apparatus comprising: providing the bale wrap cutting and retaining apparatus, the bale wrap cutting and retaining apparatus comprising a wrap cutting assembly and a wrap retaining assembly, the wrap cutting assembly comprising a saw movably coupled to a saw housing and configured to move along an arcuate path; engaging a bale with the bale wrap cutting and retaining apparatus at a bale site; moving the saw along the arcuate path to cut a bale wrap of the bale; and retaining the bale wrap on the wrap retaining assembly.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
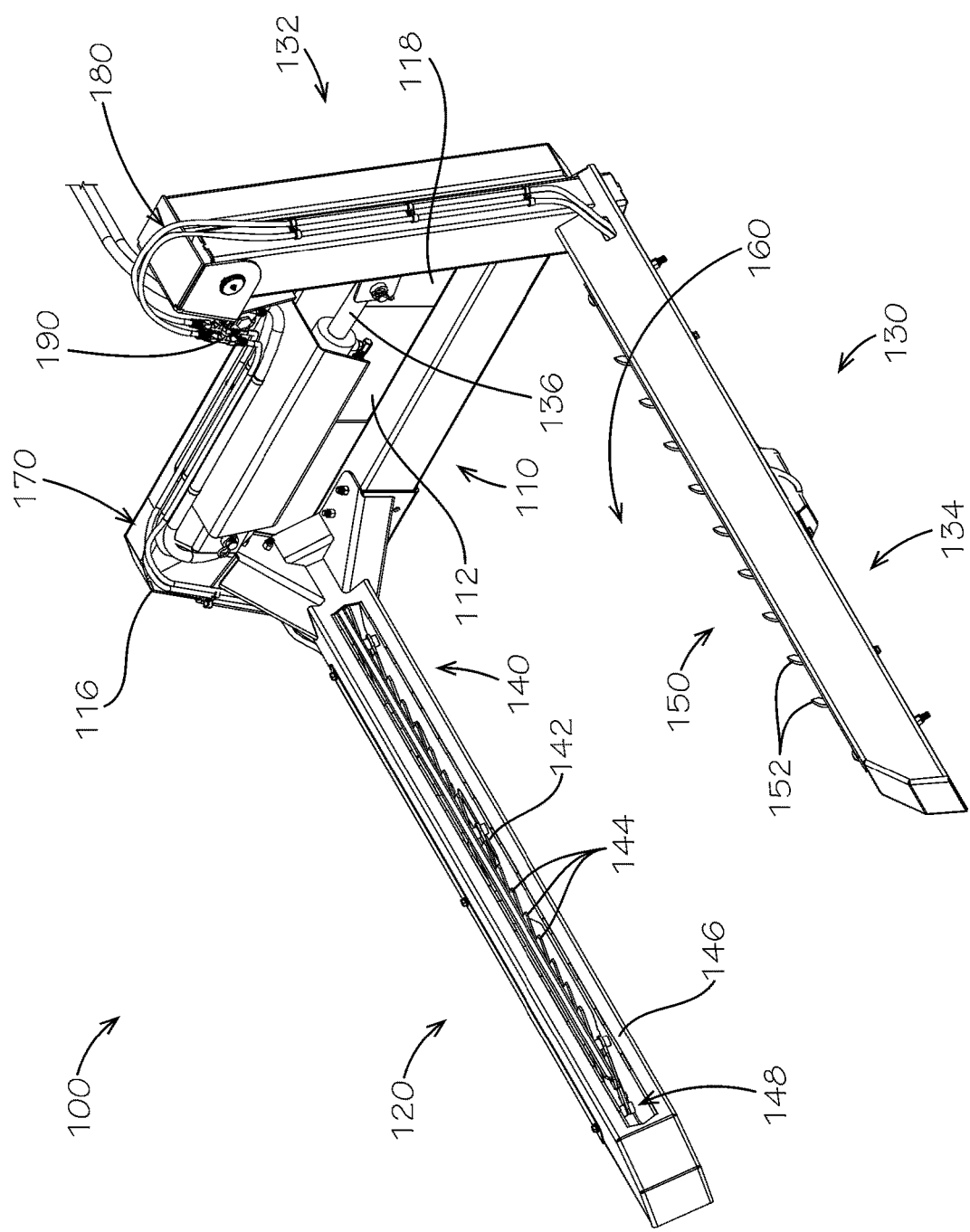
FIG. 1 is a top perspective view of a bale wrap cutting and retaining apparatus, in accordance with one aspect of the present disclosure, comprising a first arm and a second arm.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure.

It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a bale wrap cutting and retaining apparatus and associated methods, systems, devices, and various apparatus. Example aspects of the bale wrap cutting and retaining apparatus can comprise a wrap cutting assembly and a wrap retaining assembly. It would be understood by one of skill in the art that the disclosed bale wrap cutting and retaining apparatus is described in but a few exemplary aspects among many. No particular terminology or description should be considered limiting on the disclosure or the scope of any claims issuing therefrom.

Figure 2:
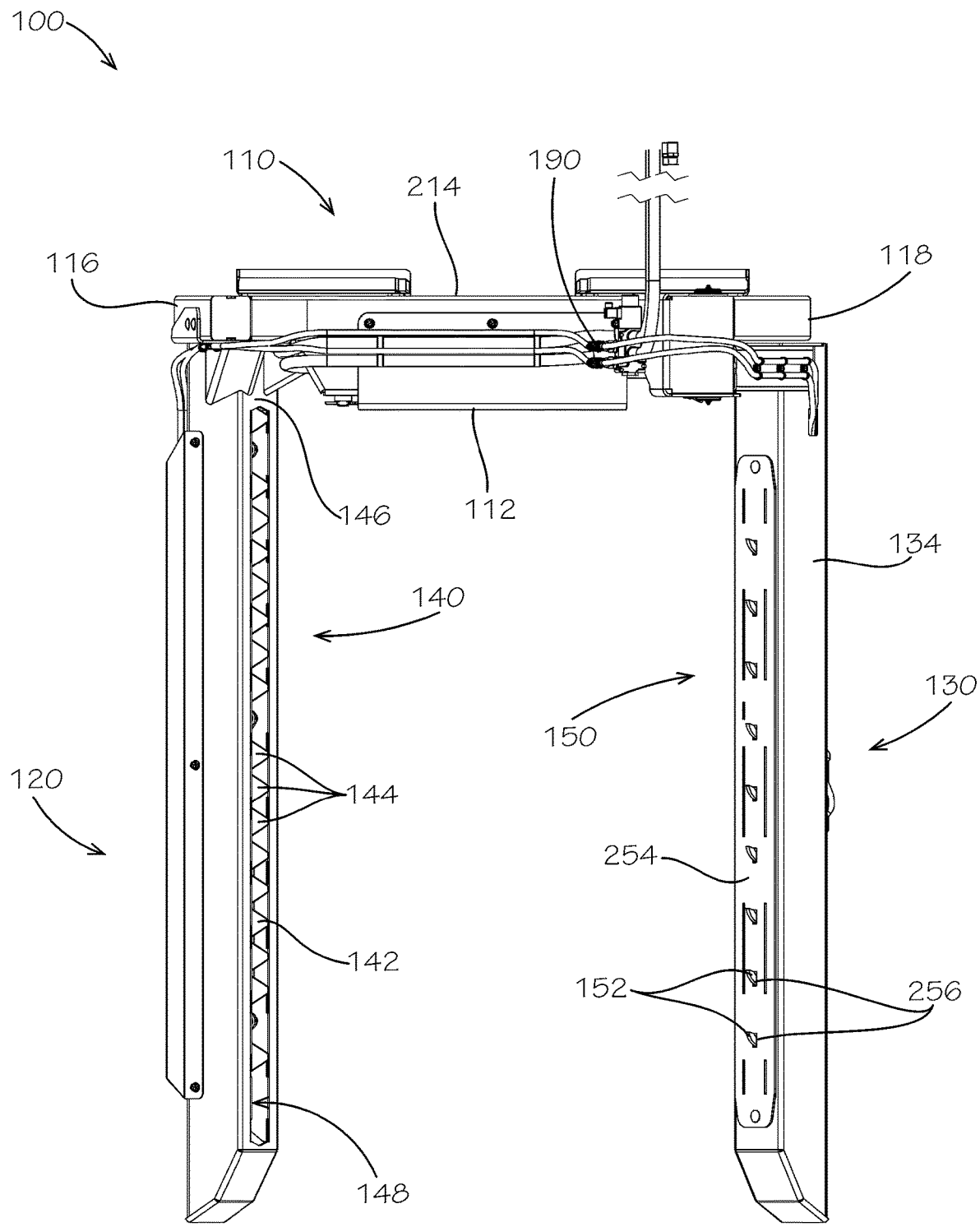
FIG. 2 is a top view of the bale wrap cutting and retaining apparatus of FIG. 1.

FIGS. 1 and 2 illustrates a first aspect of a bale wrap cutting and retaining apparatus 100, according to the present disclosure. As shown, the bale wrap cutting and retaining apparatus 100 can comprise a frame 110, a first arm 120 mounted to the frame 110, and a second arm 130 mounted to the frame 110. According to example aspects, a wrap cutting assembly 140 can be mounted to the first arm 120 and a wrap retaining assembly 150 can be mounted to the second arm 130. The bale wrap cutting and retaining apparatus 100 can be configured to support a bale 1300 (shown in FIG. 13), such as, for example, a hay bale comprising hay 1510 (shown in FIG. 15), between the first arm 120 and second arm 130. In other aspects, the bale 1300 can comprise straw, corn stalk, or any other suitable agricultural material known in the art. According to various example aspects, the bale 1300 can be covered, wrapped, collected, or bound with a bale wrap 1310 (shown in FIG. 13). Example aspects of the bale wrap 1310 can comprise twine, netting, wrapping such as plastic wrapping, or any other suitable wrapping or binding material known in the art. Example aspects of the bale wrap cutting and retaining apparatus 100 can be configured to be attached to an industrial vehicle 1120 (shown in FIG. 11), such as, for example, a skid steer loader 1320 (shown in FIG. 13), backhoe, front end loader, track loader, or any other suitable industrial machinery known in the art. The wrap cutting assembly 140 can be configured to cut the bale wrap 1310 to release the hay 1510, or other agricultural material, from the bale wrap 1310, and the wrap retaining assembly 150 can be configured to retain the bale wrap 1310 thereon for site removal from a bale site 1330 (shown in FIG. 13).

In example aspects, the frame 110 can generally define a front end 112, a rear end 214 (shown in FIG. 2), a first frame side 116, and a second frame side 118. The first arm 120 can be mounted to the frame 110 at the first frame side 116, and the second arm 130 can be mounted to the frame 110 at the second frame side 118, as shown. According to example aspects, the second arm 130 can define a mounting member 132 and an extension member 134 extending therefrom, and the mounting member 132 can be pivotably coupled to the second frame side 118. The first arm 120 can extend outward relative to the front end 112 of the frame 110, and the extension member 134 of the second arm 130 can extend outward from the mounting member 132 relative to the front end 112 of the frame 110. As shown, a bay 160 can be defined between the first arm 120 and the extension member 134 of the second arm 130, which can be configured to receive the bale 1300. As shown, the wrap cutting assembly 140 can be attached to the first arm 120, and can comprise a saw 142 configured to cut the bale wrap 1310. Example aspects of the saw 142 can comprise a plurality of teeth 144, which can extend through a saw opening 148 formed in a first front wall 146 of the first arm 120 to engage and cut the bale wrap 1310. Furthermore, according to example aspects, the wrap retaining assembly 150 can be attached to the extension member 134 of the second arm 130, and can comprise a plurality of hooks 152. The hooks 152 can be configured to extend through hook apertures 256 (shown in FIG. 2) formed in a front hook plate 254 (shown in FIG. 2) of the wrap retaining assembly 150 to engage and retain the bale wrap 1310 thereon. In other example aspects, both of the wrap cutting assembly 140 and wrap retaining assembly 150 can be mounted on either the first arm 120 or the second arm 130. In another example aspect, the bale wrap cutting and retaining apparatus 100 can comprise a singular arm, and both of the wrap cutting assembly 140 and the wrap retaining assembly 150 can be mounted to the singular arm. In still other aspects, the wrap cutting assembly 140 can be attached to the second arm 130 and the wrap retaining assembly 150 can be attached to the first arm 120.

Figure 12:
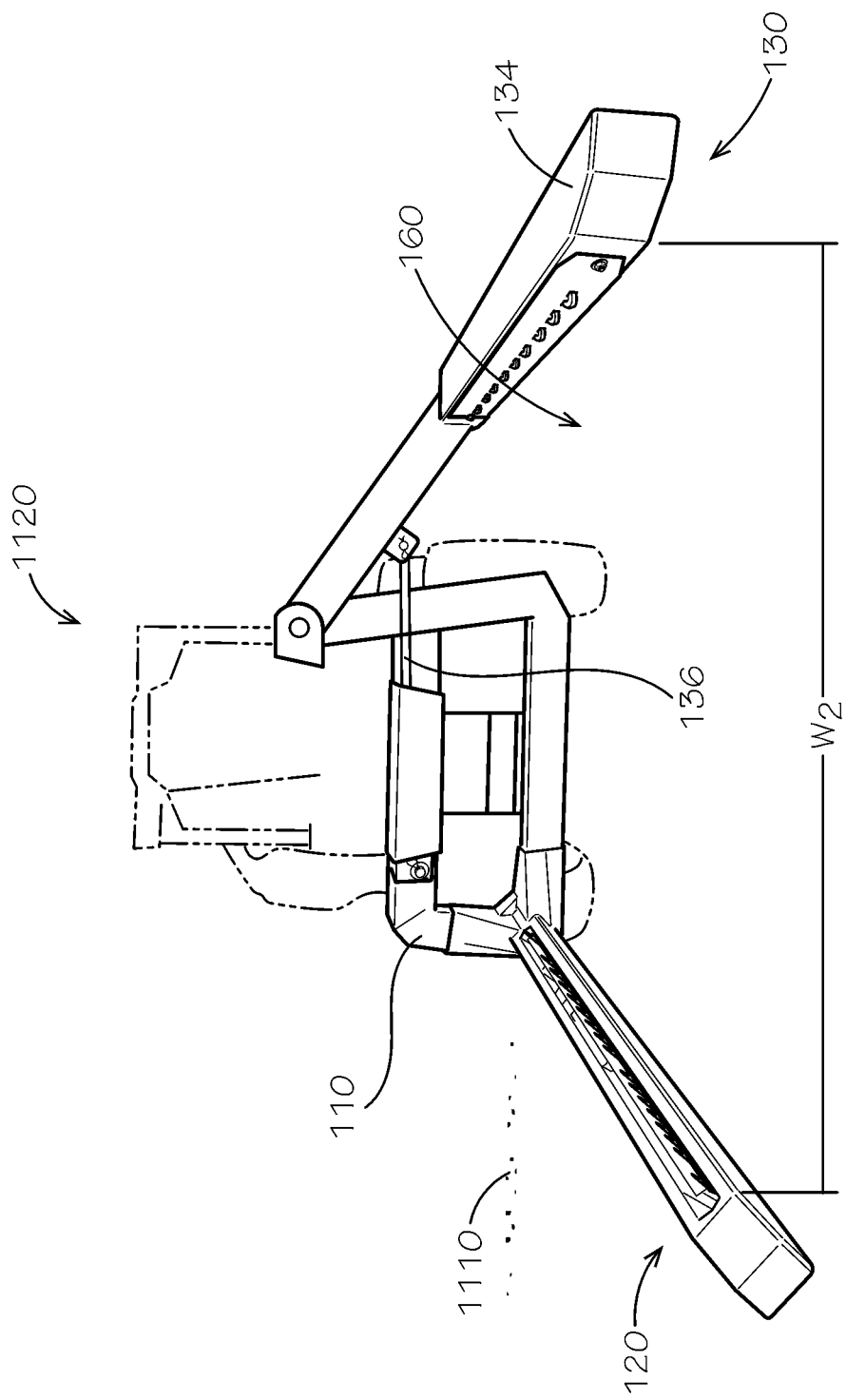
FIG. 12 is a top perspective view of the bale wrap cutting and retaining apparatus of FIG. 1, wherein the second arm of FIG. 1 is in a raised position.

According to example aspects, one or both of the first arm 120 and second arm 130 can be configured to swing relative to the frame 110. For example, in the present aspect, the second arm 130 comprising the wrap retaining assembly 150 can be configured to swing relative to the frame 110 between a lowered position, as shown in FIG. 1, and a raised position, as shown in FIG. 12. An arm actuation device 136 can be provided for selectively moving the second arm 130 between the lowered position and the raised position. In some aspects, the arm actuation device 136 can be substantially similar to the powered actuation device disclosed in U.S. application Ser. No. 15/233,626, filed Aug. 10, 2016, and published as U.S. Application Publication No. 2017-0042094 on Feb. 16, 2017, and U.S. application Ser. No. 15/932,325, filed Feb. 16, 2018, and published as U.S. Application Publication No. 2018-0220586 on Aug. 9, 2018, which are hereby incorporated by reference herein in their entireties. In other aspects, the first arm 120 may be configured to swing relative to the frame 110, instead of the second arm 130. In still other aspects, both of the first arm 120 and second arm 130 can be configured to swing relative to the frame 110.

According to example aspects, the bale wrap cutting and retaining apparatus 100 can comprise a first hydraulic circuit (not shown) for controlling the swinging movement of the second arm 130 and a second hydraulic circuit (not shown) for controlling the simultaneous operation of the wrap cutting assembly 140 and the wrap retaining assembly 150. In other aspects, however, the wrap cutting assembly 140 and wrap retaining assembly 150 may be operated individually. As shown, the bale wrap cutting and retaining apparatus 100 can comprise a first actuation assembly 170 for actuating the wrap cutting assembly 140 and a second actuation assembly 180 for actuating the wrap retaining assembly 150. In the present aspect, each of the first and second actuation assemblies 170,180 can be hydraulic actuation assemblies. According to example aspects, the arm actuation device 136 and each of the first and second actuation assemblies 170, 180 can be coupled to a selector valve 190, which can allow an operator to selectively switch between simultaneous operation of the first and second actuation assemblies 170, 180 and operation of the arm actuation device 136. The first and second actuation assemblies 170,180 are described in further detail below.

Figure 3:
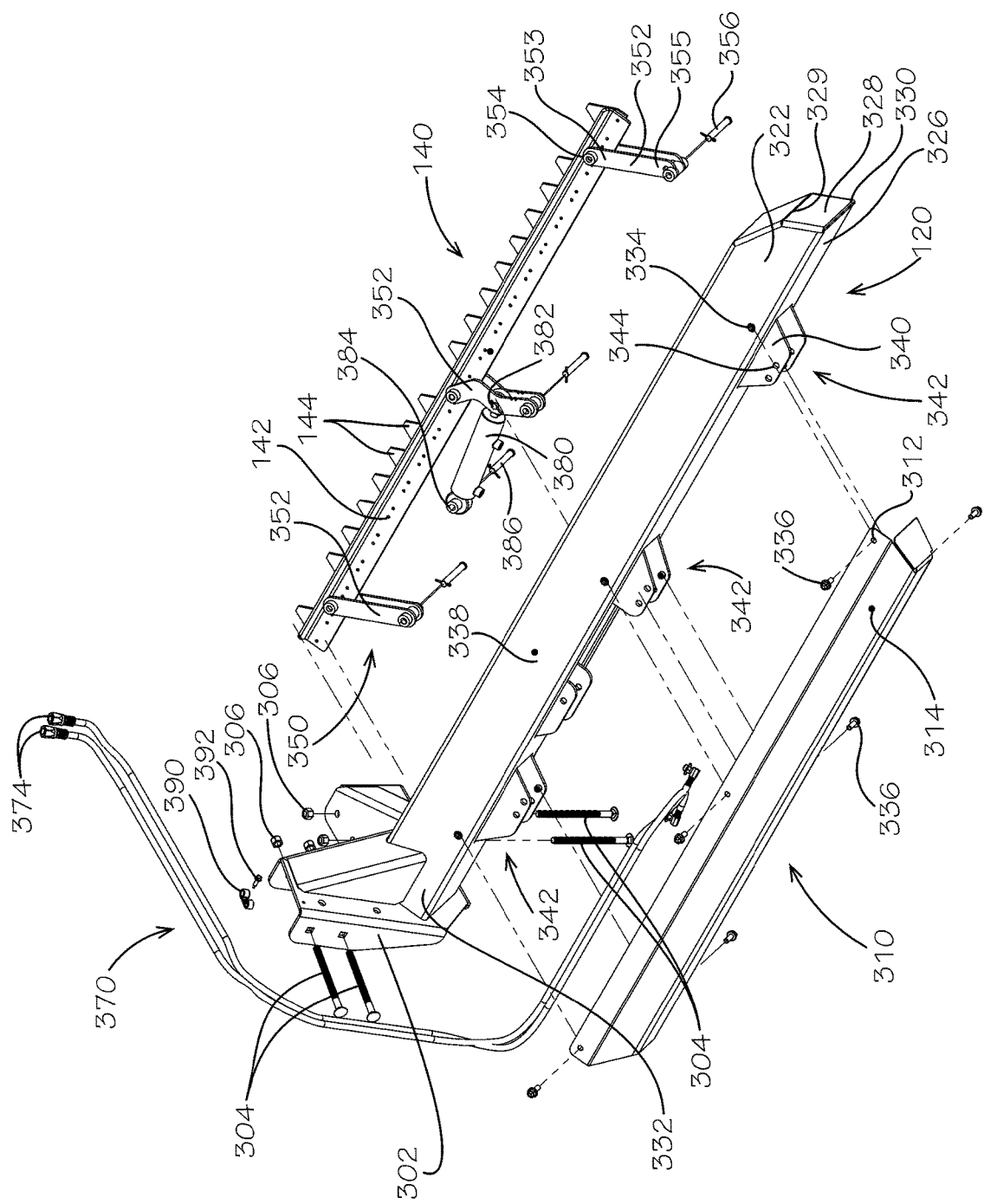
FIG. 3 is an exploded view of a wrap cutting assembly of the bale wrap cutting and retaining apparatus of FIG. 1.

FIG. 3 illustrates an exploded view of the first arm 120 and the wrap cutting assembly 140 attached thereto. According to example aspects, the first arm 120 can comprise a first upper wall 322, a first lower wall 424 (shown in FIG. 4), the first front wall 146 (shown in FIG. 1), a first rear wall 326, and a first sidewall 328. The saw opening 148 (shown in FIG. 1) can be formed in the first front wall 146, and a plurality of linkage openings 426 (shown in FIG. 4) can be formed in the first rear wall 326. The first sidewall 328 can extend between the first upper wall 322 and first lower wall 424, and between the first front wall 146 and first rear wall 326, at a distal end 330 of the first arm 120. The first sidewall 328 can further define a first bend 329, as shown. In the present aspect, a bracket 302 can be positioned at a proximal end 332 of the first arm 120 and can be configured to mount the first arm 120 to the frame 110 (shown in FIG. 1). In example aspects, as shown, bolts 304 and corresponding nuts 306 can be provided, or any other suitable fastener(s) can be provided, for attaching the bracket 302 to the frame 110. Other suitable fasteners can include, but are not limited two, screws, adhesives, welding, and the like.

Example aspects of the wrap cutting assembly 140 can comprise a saw housing 340 fixedly mounted to the first arm 120 and generally received between the first upper and lower walls 322,424 thereof. The saw housing 340 is partially hidden in the present view, but is shown in additional detail in FIG. 4. The wrap cutting assembly 140 can further comprise the saw 142, which can be movably mounted to the saw housing 340 by a linkage system 350, as shown. In the present aspect, the linkage system 350 can comprise three pivot bars 352. According to example aspects, a distal end 353 of each pivot bar 352 can be pivotably coupled to the saw 142, for example, by a first pivot pin 354. Furthermore, a proximal end 355 of each pivot bar 352 can be pivotably coupled to a corresponding connection portion 342 of the saw housing 340, for example, by a second pivot pin 356. In other aspects, the pivot bars 352 can be pivotably coupled to the saw 142 and the corresponding connection portions 342 by any other suitable pivot mechanism known in the art. As shown, each of the connection portions 342 can define a corresponding one or more second pivot pin holes 344 for receiving the second pivot pin 356 therethrough for pivotably mounting the pivot bar 352 to the connection portion 342. The linkage system 350 can allow the saw 142 to move along an arcuate path 500 (shown in FIG. 5) relative to the saw housing 340, as will be shown and described in further detail with reference to FIGS. 5-7.

According to example aspects, the wrap cutting assembly 140 can further comprise a saw shield 310. The saw shield 310 can be configured to cover and protect the connection portions 342 of the saw housing 340 and the proximal ends 355 of the pivot bars 352 connected thereto. Example aspects of the saw shield 310 can comprise one or more shield mounting holes 312, and the first arm 120 can define one or more first arm mounting holes 334. For example, the first arm mounting holes 334 can be formed in the first upper wall 322 and the first lower wall 424. Each of the shield mounting holes 312 can be aligned with a corresponding one of the first arm mounting holes 334, and screws 336 or other fasteners can be provide for coupling the saw shield 310 to the first arm 120. In some aspects, the saw shield 310 can also comprise one or more shield pivot pin holes 314 for receiving a corresponding one of the second pivot pins 356 therethrough for pivotably mounting the second pivot pin 356 to the saw shield 310 and effectively coupling the corresponding connection portion 342 to the saw shield 310. For example, in the present aspect, the saw shield 310 can comprise one shield pivot pin hole 314 configured to receive a one of the second pivot pins 356; however, other aspects of the saw shield 310 can comprise additional shield pivot pin holes 314 for receiving some or all of the remaining second pivot pins 356.

Furthermore, in the present aspect, as shown, the first actuation assembly 170 can be a hydraulic actuation assembly and can comprise a pair of hydraulic hoses 370 and a hydraulic cylinder 380. The hydraulic cylinder 380 can be operatively connected to one of the pivot bars 352 of the linkage system 350, to drive the arcuate movement of the saw 142. For example, in the present aspect, the hydraulic cylinder 380 can be coupled at a first end 382 thereof to a middle one of the pivot bars 352, and can be coupled at a second end 384 thereof to the first arm 120 by a fastener 386. In the current aspect, the middle one of the pivot bars 352 is an S-shaped driven arm; in other aspects, the middle one of the pivot bars 352 may define any other suitable shape. As shown, the first arm 120 can comprise a cylinder fastening hole 338 through which a fastener can be received for fastening the hydraulic cylinder 380 thereto. According to example aspects, the hydraulic hoses 370 can be coupled to the hydraulic cylinder 380 at proximal ends 372 thereof and can be coupled to the selector valve 190 (shown in FIG. 1) at distal ends 374 thereof. According to example aspects, the saw shield 310 can be configured to cover and protect the hydraulic cylinder 380 in addition to the connection portions 342 of the saw housing 340. Furthermore, in the present aspect, an internal length of the hydraulic hoses 370 can also be covered by the saw shield 310, and an external length of the hydraulic hoses 370 can extend along the bracket 302 and around the frame 110 to engage the selector valve 190. In some example aspects, one or more hose clamps 390 can be provided for clamping the hydraulic hoses 370 to the bracket 302 at a point along the external length of the hydraulic hoses 370. A screw 392, or other suitable fastener, can be provided for attaching each of the hose clamps 390 to the bracket 302.

Figure 4:
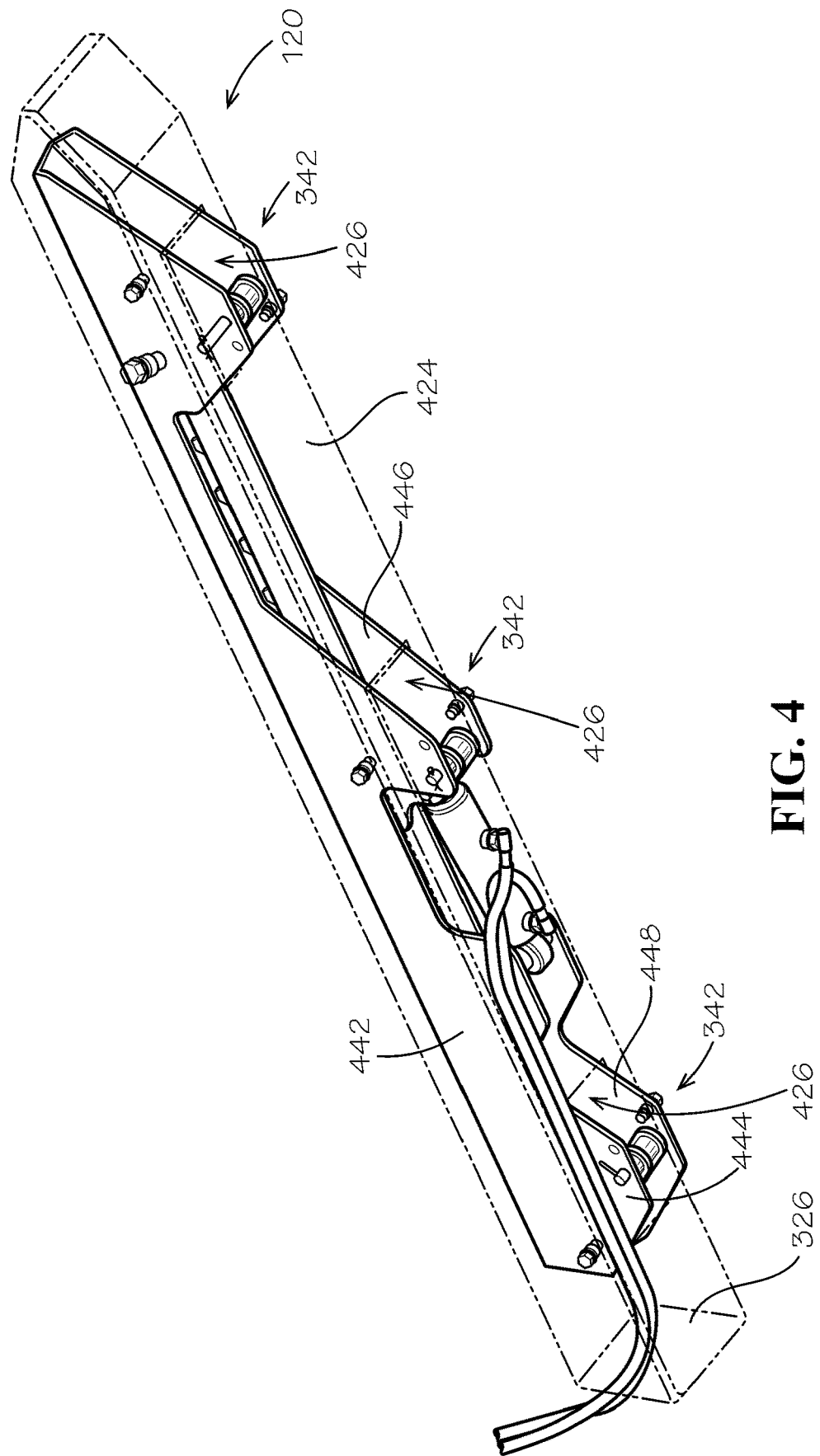
FIG. 4 is a perspective view of the wrap cutting assembly of FIG. 3.

In FIG. 4, the first arm 120 is illustrated as transparent for visibility of the saw housing 340. As shown, the saw housing 340 can define an upper housing plate 442 and a lower housing plate 446. Each of the connection portions 342 can comprise an upper projection 444 extending from the upper housing plate 442 and a lower projection 448 extending from the lower housing plate 446. As shown, each pair of upper and lower housing projections 444, 448 can extend through a corresponding one of the linkage openings 426 formed in the first rear wall 326 of the first arm 120.

Figure 5:
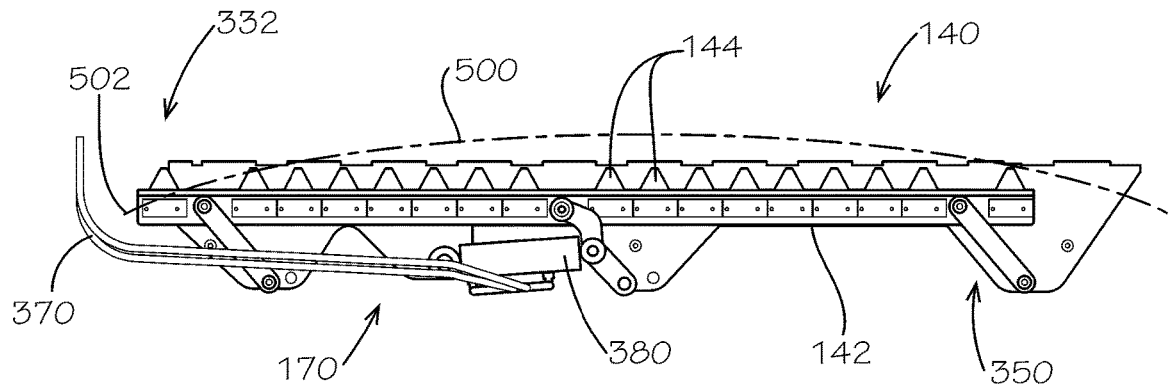
FIG. 5 is a top view of the wrap cutting assembly of FIG. 3 in a first position.
Figure 6:
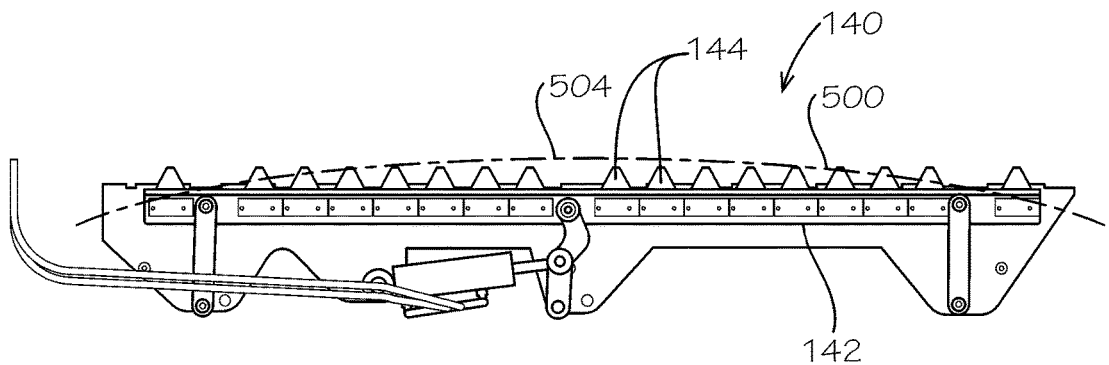
FIG. 6 is a top view of the wrap cutting assembly of FIG. 3 in a second position.
Figure 7:
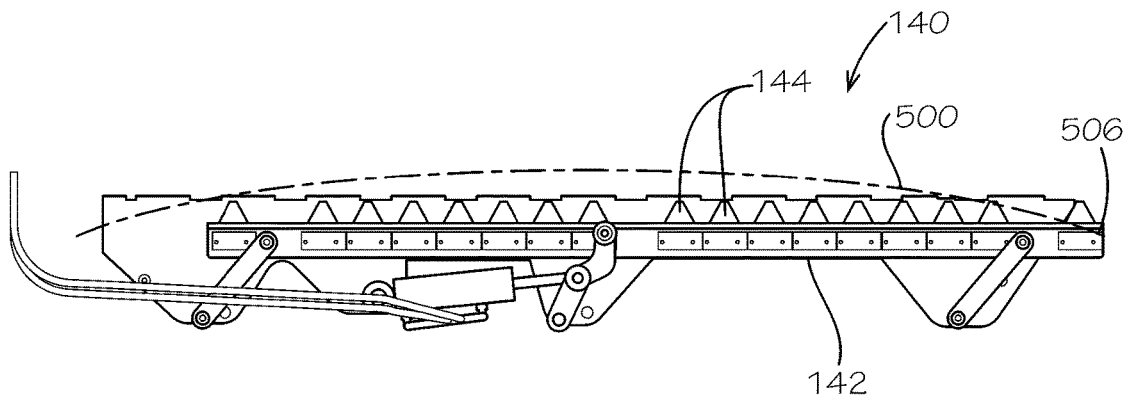
FIG. 7 is a top view of the wrap cutting assembly of FIG. 3 in a third position.

FIGS. 5-7 illustrate the saw 142 of the wrap cutting assembly 140 driven through the arcuate path 500 by the first actuation assembly 170. FIG. 5 illustrates the saw 142 in a first position. In the first position, the saw 142 can be pivoted by the linkage system 350 towards the proximal end 332 of the first arm 120 (shown in FIG. 1), to a first end 502 of the arcuate path 500. The saw 142 may or may not extend through the saw opening 148 (shown in FIG. 1) of the first arm 120 (shown in FIG. 1) in the first position. In a second position, as shown in FIG. 6, the saw 142 can be pivoted towards the right, relative to the orientation shown, to a center 504 of the arcuate path 500. In the second position, the saw 142, and in particular the teeth 144, can extend through the saw opening 148 of the first arm 120. In a third position, as shown in FIG. 7, the saw 142 can be pivoted further to the right, relative to the orientation shown, to a second end 506 of the arcuate path 500. In the third position, the saw 142 may or may not extend through the saw opening 148. As the saw 142 moves along the arcuate path 500 and extends out of the saw opening 148, the teeth 144 of the saw 142 can engage and cut through the bale wrap 1310 of a bale 1300 (shown in FIG. 13) received within the bay 160 (shown in FIG. 1).

Figure 8:
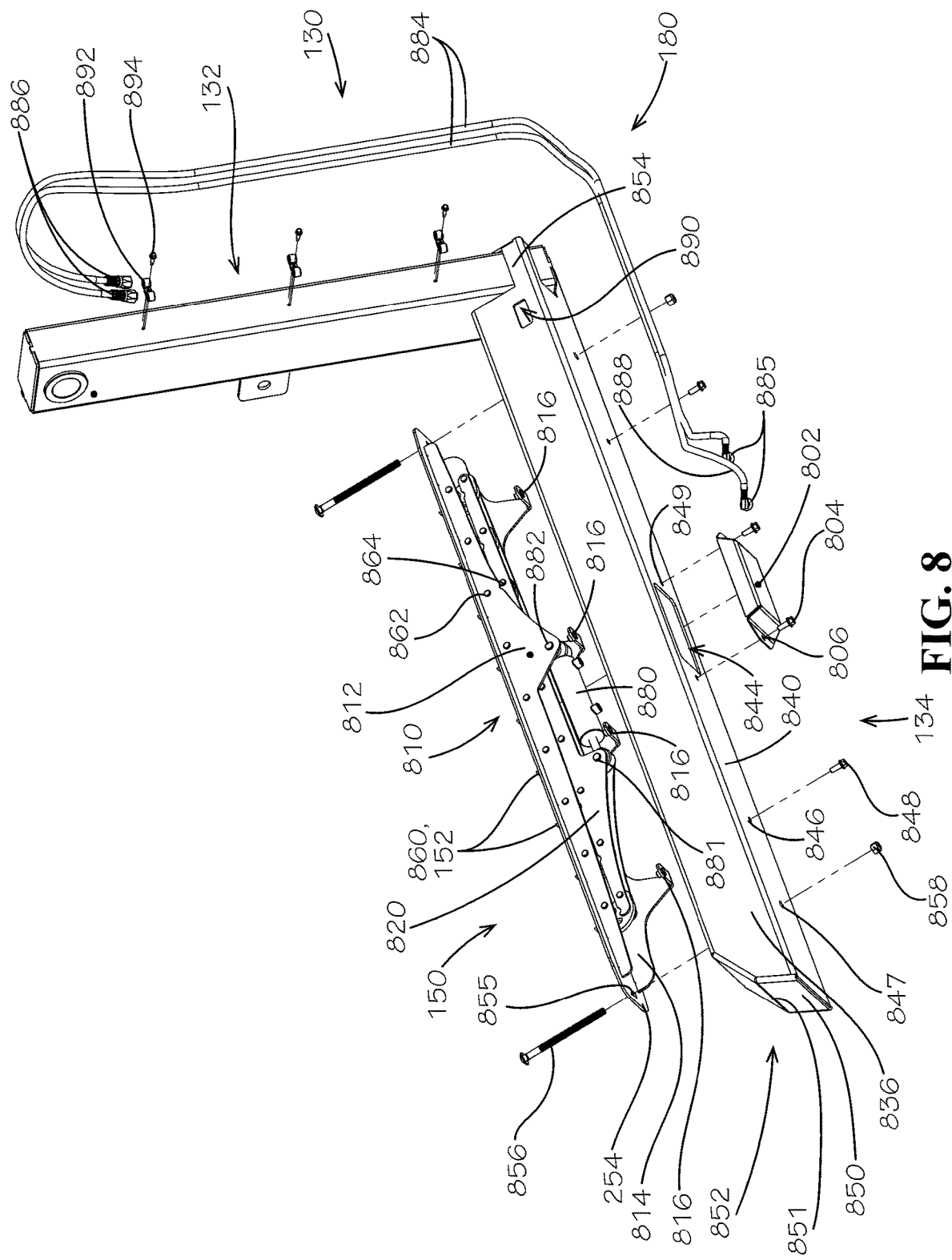
FIG. 8 is an exploded view of a wrap retaining assembly of the bale wrap cutting and retaining apparatus of FIG. 1.
Figure 9:
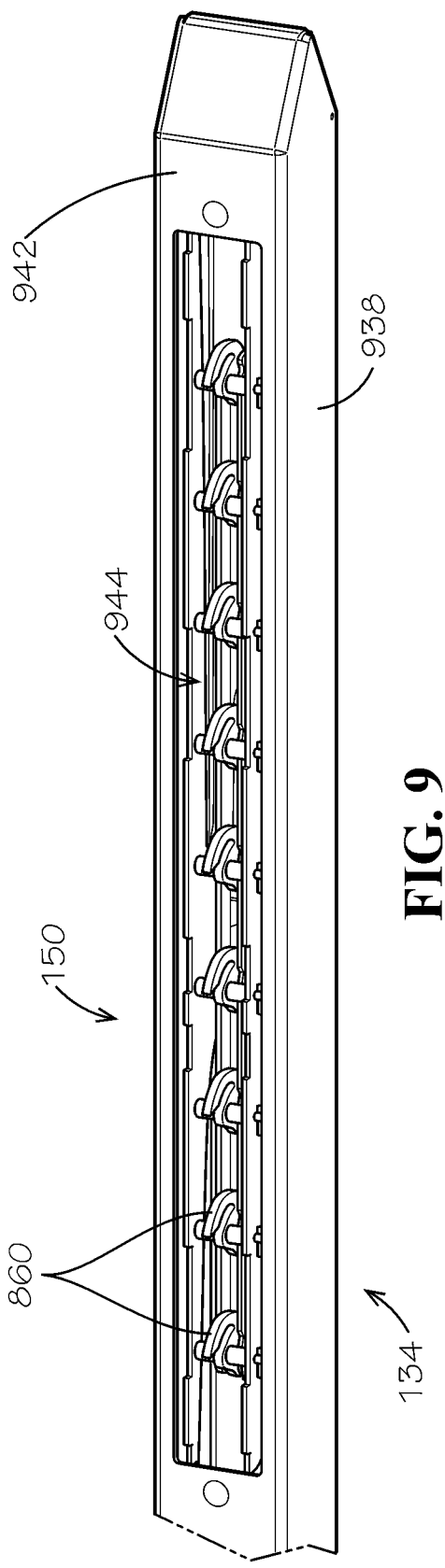
FIG. 9 is a bottom perspective view of the wrap retaining assembly of FIG. 8.

FIG. 8 illustrates an exploded view of the wrap retaining assembly 150 and the second arm 130. Example aspects of the wrap retaining assembly 150 can be similar to the hook apparatus disclosed in U.S. application Ser. No. 15/233,626 and U.S. application Ser. No. 15/932,325, previously incorporated by reference above. As shown, the extension member 134 of the second arm 130 can define a second upper wall 836, a second lower wall 938 (shown in FIG. 9), a second rear wall 840, a second front wall 942 (shown in FIG. 9), and a second sidewall 850. A hook opening 944 (shown in FIG. 9) can be formed in the second front wall 942, and a rear window 844 can be formed in the second rear wall 840. The second sidewall 850 can extend between the second upper wall 836 and second lower wall 938, and between the second front wall 942 and second rear wall 840, at a distal end 852 of the extension member 134, and can define a second bend 851, as shown. Furthermore, the extension member 134 can be mounted to the mounting member 132 at a proximal end 854 thereof. In example aspects, the extension member 134 can be secured to the mounting member 132 by welding. However, in other aspects, the extension member 134 can be secured to the mounting member 132 by any other suitable fastener known in the art, including, but not limited to, bolts, screws, adhesives, and the like.

Example aspects of the wrap retaining assembly 150 can comprise can comprise a hook housing 810 fixedly mounted to the extension member 134. The hook housing 810 can define an upper hook plate 812, a lower hook plate 814, and the front hook plate 254 extending substantially perpendicular to the upper hook plate 812 and lower hook plate 814. According to example aspects, the upper hook plate 812 and lower hook plate 814 can be received generally between the second upper wall 836 and second lower wall 938 of the extension member 134. The front hook plate 254 can abut the second front wall 942 of the extension member 134 and can be configured to cover the hook opening 944 formed therethrough. Furthermore, the hook apertures 256 (shown in FIG. 2) through which the hooks 152 can extend can be formed in the front hook plate 254. In the present aspect, the lower hook plate 814 can define a plurality of hook housing mounting brackets 816 configured to align with corresponding rear wall mounting holes 846 formed in the second rear wall 840 of the extension member 134. Fasteners, such as screws 848, can be received through the hook housing mounting brackets 816 and rear wall mounting holes 846 to mount the hook housing 810 to the extension member 134. In some aspects, the front hook plate 254 can comprise one or more front hook plate mounting holes 855 configured to align with corresponding rear wall mounting holes 847, and a fastener, such as a bolt 856 can extend through each corresponding pair of front hook plate mounting holes 855 and rear wall mounting holes 847. In the present aspect, a nut 858 can be provided for securing the bolt 856 in place. In other aspects, any other suitable fastener known in the art can be used.

Furthermore, a movable shuttle 820 can be received generally between the upper hook plate 812 and the lower hook plate 814. A plurality of wrap retainers 860 can each be pivotably supported on a bearing 862, and each of the bearings 862 can be mounted to the hook housing 810. Each of the wrap retainers 860 can also be pivotably mounted to the shuttle 820 by a hook pivot pin 864. The wrap retaining assembly 150 can further comprise the second actuation assembly 180 for actuating the movement of the shuttle 820. In example aspects, the second actuation assembly 180 can be a hydraulic actuation assembly and can comprise a hydraulic cylinder 880 and a pair of hydraulic hoses 884. The hydraulic cylinder 880 can be coupled at a first end 881 thereof to the shuttle 820 and at a second end 882 thereof to the hook housing 810. The hydraulic cylinder 880 can drive the motion of the shuttle 820 relative to the hook housing 810, which in turn can drive a motion of the wrap retainers 860, as will be described in further detail below. According to various example aspects, the hydraulic cylinder 880 can be configured to drive the shuttle 820 back and forth along a substantially linear path.

As shown, the hydraulic hoses 884 can be coupled to the hydraulic cylinder 880 at proximal ends 885 thereof and can be coupled to the selector valve 190 (shown in FIG. 1) at distal ends 886 thereof. According to some example aspects, a curved portion 888 of the hydraulic hoses 884 proximate to the proximal ends 885 thereof can extend through the rear window 844 formed in the second rear wall 840 of the extension member 134. In example aspects, as shown, a window cover 802 can be provided for covering the rear window 844 and protecting the curved portion 888 of the hydraulic hoses 884 extending therethrough. In other example aspects, however, the hydraulic hoses 884 may not extend through the rear window 844, and the rear window 844 can simply serve to allow access to the second actuation assembly 180. In some aspects, one or more fasteners, such as, for example, screws 804, can be provided for attaching the window cover 802 to the second rear wall 840. For example, in the present aspect, each of the screws 804 can engage a window cover hole 806, a rear wall window hole 849, and one of the hook housing mounting brackets 816. In the present aspect, an internal length of the hydraulic hoses 884 can extend within the extension member 134 from their proximal ends 885 towards the mounting member 132. The hydraulic hoses 884 can then be fed through a hose opening 890 formed near the proximal end 854 of the extension member 134, and an external length of the hydraulic hoses 884 can extend substantially along the mounting member 132. In some aspects, as shown, one or more hose clamps 892 can be provided for clamping the external length of the hydraulic hoses 884 against the mounting member 132 at various points. Screws 894, or other suitable fasteners, can be provided for attaching the hose clamps 892 to the mounting member 132.

Figure 10:
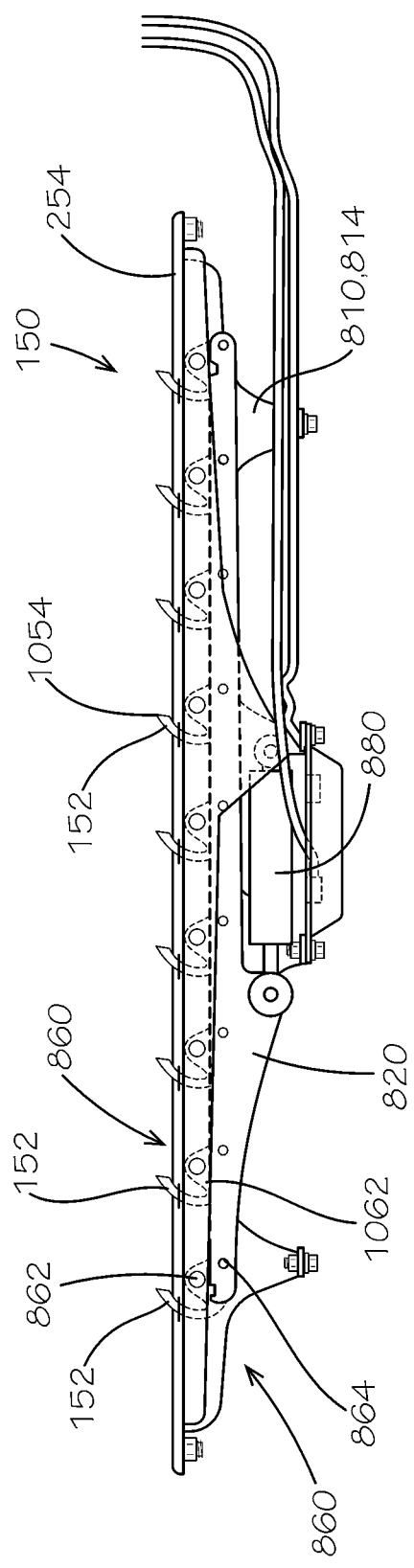
FIG. 10 is a top view of the wrap retaining assembly of FIG. 5.

FIG. 10 illustrates the wrap retaining assembly 150 with the upper hook plate 812 (shown in FIG. 8) of the hook housing 810 removed for visibility of internal components. As shown, each of the wrap retainers 860 can comprise a retainer plate 1062 and one of the hooks 152 extending arcuately therefrom. Each retainer plate 1062 can be rotatably coupled to a corresponding one of bearings 862 connected to the hook housing 810, and further rotabably coupled to the shuttle 820 by a corresponding one of the hook pivot pins 864. In the present aspect, the wrap retaining assembly 150 can comprise nine of the wrap retainers 860 generally evenly spaced along a length of shuttle 820. In other aspects, the wrap retaining assembly 150 can comprise more or fewer wrap retainers 860 and/or the wrap retainers 860 can be oriented in any other suitable arrangement.

As shown, each of the hook pivot pins 864 can be radially offset from the corresponding bearing 862. The offset can create a camming affect that can cause each of the hooks 152 to simultaneously sweep through the corresponding hook apertures 256 (shown in FIG. 2) formed in the front hook plate 254 when the hydraulic cylinder 880 moves the shuttle 820 along the linear path. Each of the hooks 152 can define pointed ends 1054 which can be configured to pierce through the bale wrap 1310 of the bale 1300 (shown in FIG. 13) (for example, in aspects wherein the bale wrap 1310 comprising a plastic wrap) and/or pierce into the bale 1300 received in the bay 160 (shown in FIG. 1) as the hooks 152 arc through the apertures 256 and into the bale 1300. Swept portions of the bale wrap 1310 can be captured within the swept length of each hook 152. Optionally, a mechanical stop (not shown) may be present for limiting the movement of the shuttle 820 and preventing each of the hooks 152 from piercing back through the bale wrap 1310. Furthermore, in some example aspects, the wrap retainers 860 can be positioned substantially along a length of the bale 1300. As such, the swept portions of the bale wrap 1310 can be captured and retained by the multiple wrap retainers 860 along a substantial length of the bale wrap 1310.

Figure 11:
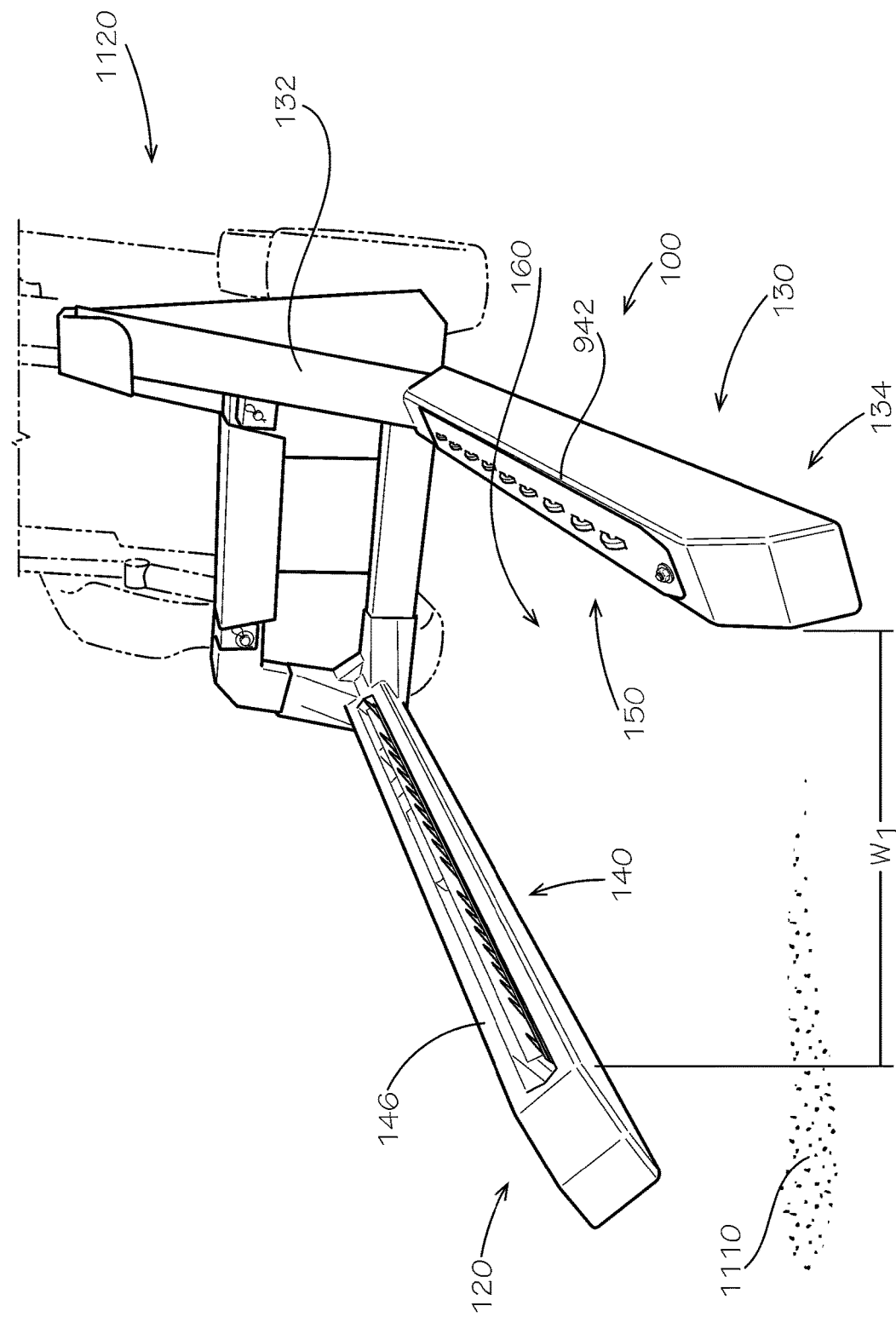
FIG. 11 is a top perspective view of the bale wrap cutting and retaining apparatus of FIG. 1, wherein the second arm of FIG. 1 is in a lowered position.

FIG. 11 illustrates the bale wrap cutting and retaining apparatus 100 mounted to an industrial vehicle 1120. In example aspects, the industrial vehicle 1120 and the bale wrap cutting and retaining apparatus 100 can be operated by a vehicle operator within the industrial vehicle 1120; however, in other aspects the industrial vehicle 1120 and bale wrap cutting and retaining apparatus 100 can be operated by a remote operator. In the present FIG. 11, the second arm 130 is illustrated in the lowered position. In the lowered position, the first arm 120 and the extension member 134 of the second arm 130 can be oriented at about the same height, and can be oriented close to a ground surface 1110, which can allow for easy loading, grasping, or scooping of a bale 1300 into the bay 160 defined therebetween. Furthermore, as shown, the first front wall 146 of the first arm 120 and the second front wall 942 of the extension member 134 can face substantially inward towards the bay 160, such that the wrap cutting assembly 140 and wrap retaining assembly 150 can face and engage the bale 1300 received in the bay 160. According to example aspects, with the second arm 130 in the lowered position, the bay 160 can define a width $W_1$. FIG. 12 illustrates the second arm 130 in the raised position, wherein the second arm 130 is pivoted upwards relative to the frame 110 by the arm actuation device 136, such that the extension member 134 of the second arm 130 is elevated above the first arm 120. Furthermore, as shown, in the raised position, the bay 160 can define a width $W_2$, which can be greater than the width $W_1$ of the bay 160 when the second arm 130 is in the lowered position.

Figure 13:
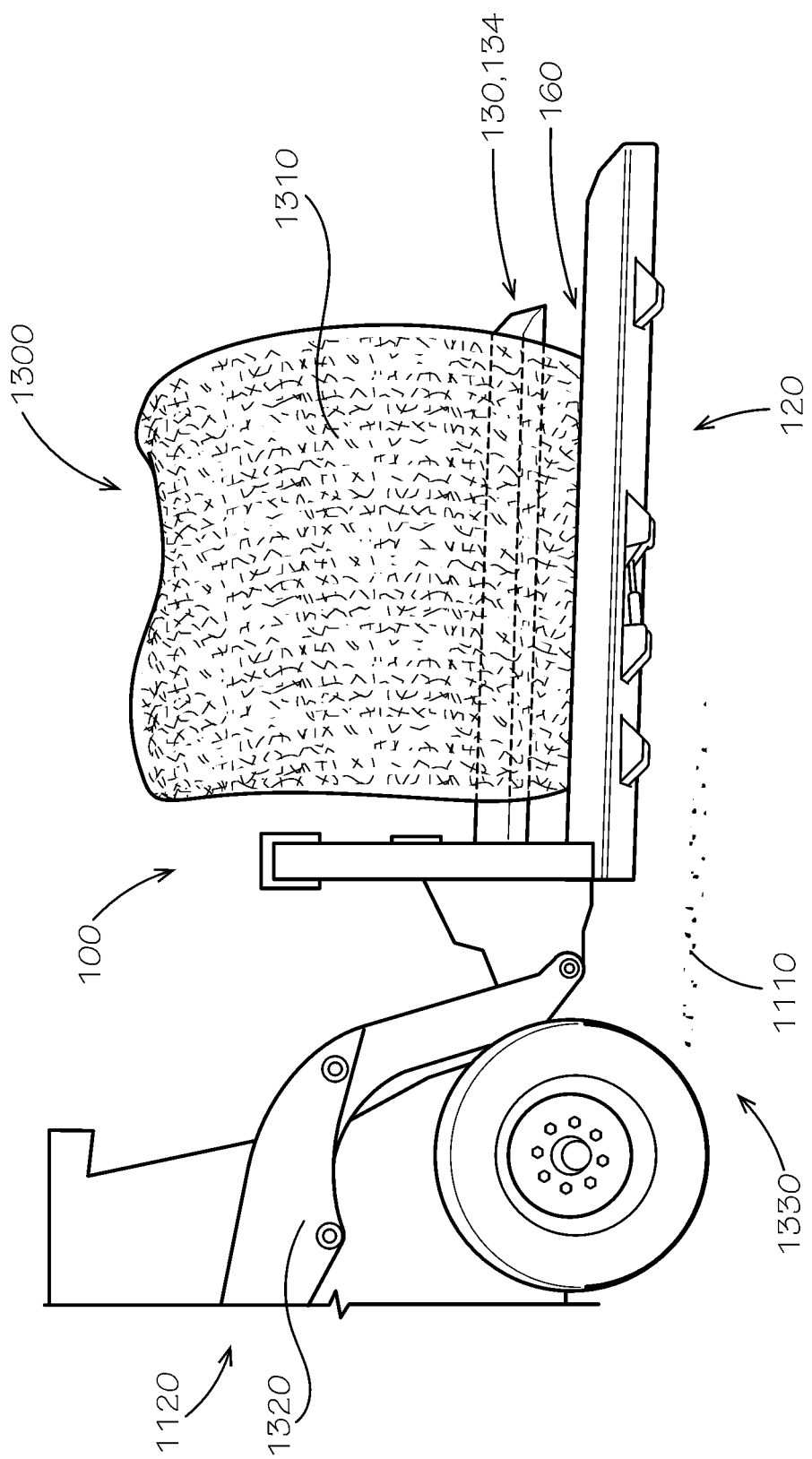
FIG. 13 illustrates a first step in a method of using the bale wrap cutting and retaining apparatus of FIG. 1.
Figure 14:
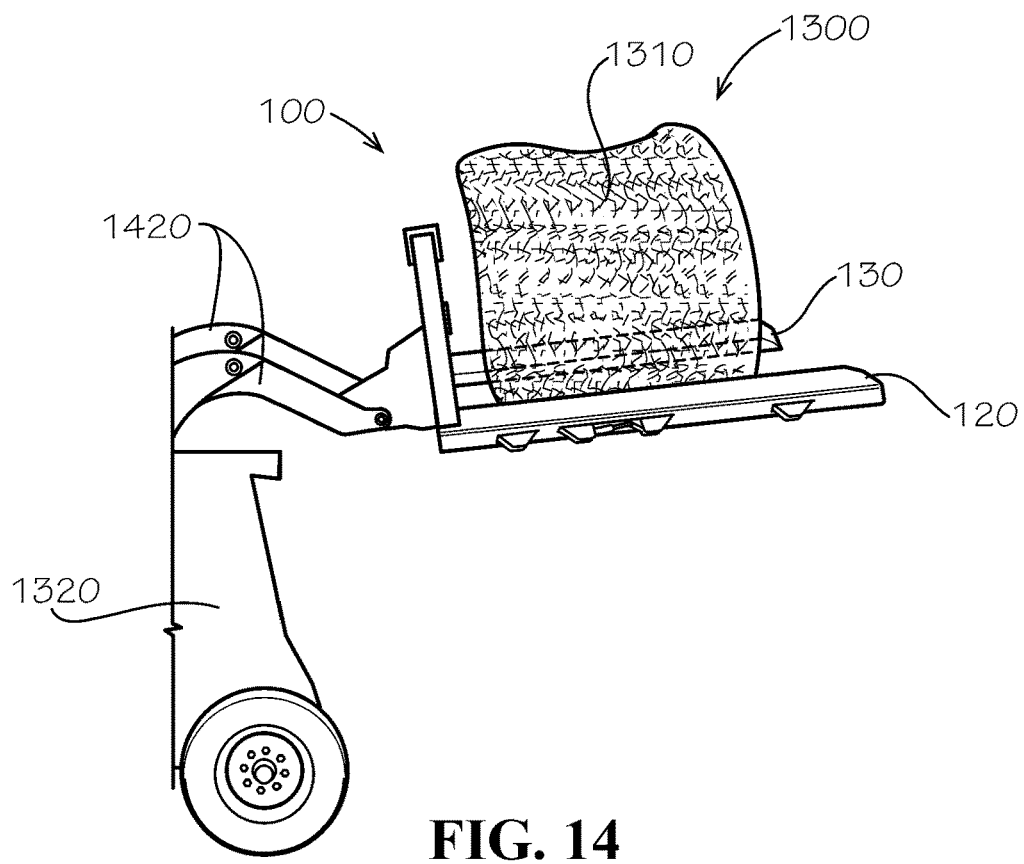
FIG. 14 illustrates a second step in the method of using the bale wrap cutting and retaining apparatus of FIG. 1.

A method for using the bale wrap cutting and retaining apparatus 100 is illustrated in FIG. 13-16. As shown in FIG. 13, the bale wrap cutting and retaining apparatus 100 can be mounted on the industrial vehicle 1120, which in the present aspect can be a skid-steer loader 1320. One or more bales 1300 can be located at the bale site 1330, such as, for example, a farm. In a first step of the method, the second arm 130 can be in the lowered position and a one of the bales 1300 can be received within the bay 160. In one aspect, to mount the bale 1300 on the bale wrap cutting and retaining apparatus 100, the second arm 130 can be raised to the raised position (shown in FIG. 12), and the industrial vehicle 1120 can be driven towards the bale 1300, such that the bale 1300 is oriented between the first arm 120 and second arm 130 while resting on the ground surface 1110. In the raised position, the width $W_2$ of the bay 160 can be greater than a diameter of the bale 1300. Then, the second arm 130 can be moved to the lowered position, positioned below a center of the bale 1300, wherein the width $W_1$ of the bay 160 can be less than the diameter of the bale 1300. FIG. 14 illustrates a next step in the method, wherein the bale wrap cutting and retaining apparatus 100 is elevated to a greater height above the ground surface 1110, to provide an increased amount of space between the bale 1300 and the ground surface 1110. For example, in the present aspect, the skid-steer loader 1320 can comprise lift arms 1420 for elevating the bale wrap cutting and retaining apparatus 100, as shown. In other aspects, however, the bale wrap cutting and retaining apparatus 100 need not be elevated further above the ground surface 1110. Moreover, in other aspects, the method for mounting the bale 1300 on the bale wrap cutting and retaining apparatus 100 can differ. For example, in another aspect, the first arm 120 and the extension member 134 of the second arm 130 can be oriented sufficiently close to the ground surface 1110, such that the industrial vehicle 1120 can be driven towards the bale 1300, and the bale 1300 can be scooped into the bay 160 by the first arm 120 and the extension member 134. In such an aspect, the first sidewall 328 (shown in FIG. 3) of the first arm 120 comprising the first bend 329 (shown in FIG. 3) and the second sidewall 850 (shown in FIG. 8) of the extension member 134 comprising the second bend 851 (shown in FIG. 8) can each define a sidewall shape that can aid in guiding the bale 1300 onto the first arm 120 and extension member 134. In still other aspects, however, the bale 1300 may be loaded into the bay 160 manually or by a piece of equipment.

The operator can then selectively switch to the first hydraulic circuit for controlling the simultaneous operation of the wrap cutting assembly 140 (shown in FIG. 1) and the wrap retaining assembly 150 (shown in FIG. 1). The wrap cutting assembly 140 can be actuated by the first actuation assembly 170 (shown in FIG. 1) to move the saw 142 (shown in FIG. 1) along the arcuate path 500 (shown in FIG. 5). As the saw 142 moves through the arcuate path 500, the teeth 144 (shown in FIG. 1) of the saw 142 can engage and cut the bale wrap 1310. Simultaneously, the wrap retaining assembly 150 can be actuated by the second actuation assembly 180 (shown in FIG. 1). The second actuation assembly 180 can impart movement to the shuttle 820 (shown in FIG. 8), which can actuate each of the wrap retainers 860 (shown in FIG. 8) along a cam profile to pierce the hooks 152 (shown in FIG. 1) of the wrap retainers 860 into the bale 1300 and to capture the bale wrap 1310 on the hooks 152.

Figure 15:
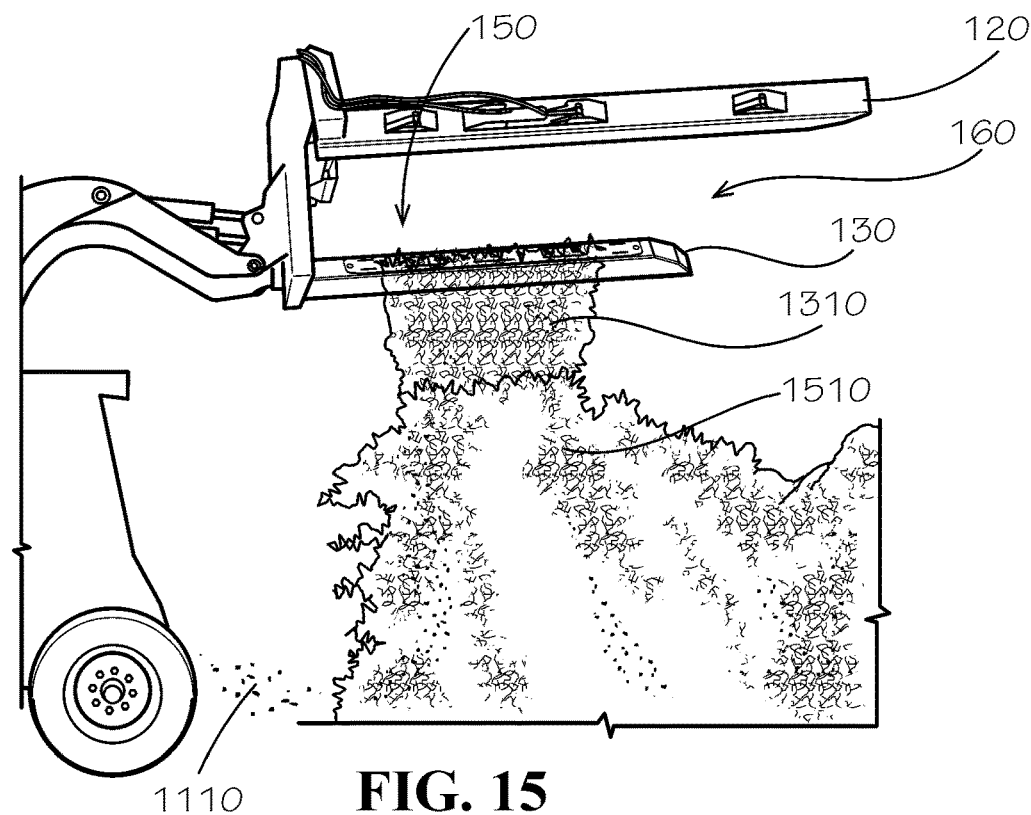
FIG. 15 illustrates a third step in the method of using the bale wrap cutting and retaining apparatus of FIG. 1.

Once the bale wrap 1310 of the bale 1300 has been cut by the wrap cutting assembly 140 and captured on the wrap retaining assembly 150, the operator can then selectively switch to the second hydraulic circuit for controlling the swinging motion of the second arm 130. The arm actuation device 136 (shown in FIG. 1) can move the second arm 130 from the lowered position to raised position, as shown in FIG. 15. When the second arm 130 is moved to the raised position, the bay 160 defined between the first arm 120 and second arm 130 can be widened. As the bay 160 is widened, the weight of the hay 1510, or other agricultural material, can bear down on the bale wrap 1310. Because the bale wrap 1310 has been cut by the wrap cutting assembly 140 (shown in FIG. 1), the bale wrap 1310 can split to release the hay 1510, and the hay 1510 can fall to the ground surface 1110, as shown, where it can be easily accessed by workers or nearby animals. According to example aspects, the bale wrap 1310 can be retained by the wrap retaining assembly 150, such that the bale wrap 1310 does not fall to the ground surface 1110 with the hay 1510, but rather remains elevated on the second arm 130, as shown.

Figure 16:
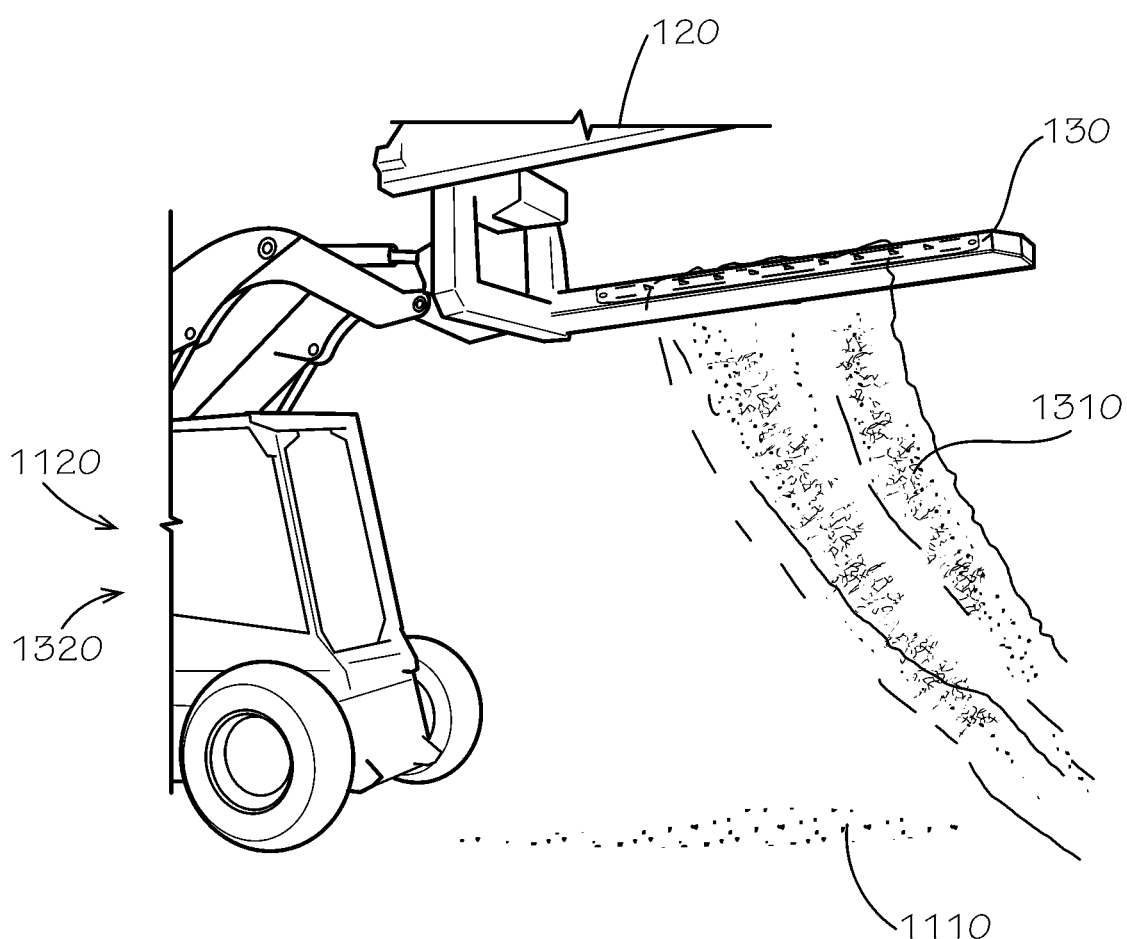
FIG. 16 illustrates a fourth step in a method of using the bale wrap cutting and retaining apparatus of FIG. 1.

Referring to FIG. 16, the operator can then drive the skid-steer loader 1320, or other industrial vehicle 1120, away from the hay 1510 (shown in FIG. 15) or other agricultural material with the bale wrap 1310 retained thereon to remove the bale wrap 1310 from the bale site 1330 (shown in FIG. 13).

As can be understood from the above description, the bale wrap cutting and retaining apparatus 100 can provide numerous advantages. For example, the bale wrap cutting and retaining apparatus 100 can be mounted to an industrial vehicle 1120, which can be capable of handling and maneuvering the heavy weight of the bale 1300. The bale wrap cutting and retaining apparatus 100 can also provide the wrap cutting assembly 140, which can easily and safely cut the bale wrap 1310 without manual effort. In some aspects, the wrap cutting assembly 140 can be elevated above any nearby animals and/or workers, such that the animals and/or workers are not endangered by the sharp teeth 144 of the saw 142. The bale wrap cutting and retaining apparatus 100 can also provide the wrap retaining assembly 150, which can retain the bale wrap 1310 thereon after the agricultural material has been released, such that it can be removed from the bale site 1330 for the safety of nearby animals. Other advantages of the bale wrap cutting and retaining apparatus 100 can also be provided.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A wrap cutting assembly for a bale wrap comprising:
a saw housing defining a connection portion;
a saw comprising a plurality of teeth configured to cut the bale wrap; and
a linkage system comprising at least one pivot bar movably coupling the saw to the saw housing and configured to laterally translate the saw along an arcuate path;
wherein the saw further comprises a saw plate, the plurality of teeth extending from an inner edge of the saw plate, wherein the linkage system is coupled to the saw plate, and wherein the saw plate and the plurality of teeth translate laterally along the arcuate path.

2. The wrap cutting assembly of claim 1, wherein the pivot bar is pivotably coupled to the saw at the distal end and pivotably coupled to the connection portion at the proximal end.

3. The wrap cutting assembly of claim 2, wherein the linkage system further comprises a first pivot pin pivotably coupling the pivot bar to the saw and a second pivot pin pivotably coupling the pivot bar to the connection portion.

4. The wrap cutting assembly of claim 1, further comprising a first hydraulic actuation assembly configured to drive the movement of the saw along the arcuate path, the first hydraulic actuation assembly comprising a hydraulic cylinder and a pair of hydraulic hoses, the hydraulic cylinder coupled to the pivot bar.

5. The wrap cutting assembly of claim 1, further comprising a saw shield configured to cover the connection portion of the saw housing.

6. A bale wrap cutting and retaining apparatus for use with a bale comprising:
- a frame;
- a first arm mounted to the frame;
- a second arm mounted to the frame, the first arm and second arm defining a bay therebetween configured to receive the bale;
- a wrap cutting assembly configured to cut a bale wrap of the bale, the wrap cutting assembly mounted to the first arm and comprising a saw configured to translate laterally along an arcuate path relative to the first arm; and
- a wrap retaining assembly mounted to the second arm and comprising a plurality of wrap retainers, the plurality of wrap retainers configured to retain a swept portion the bale wrap of the bale;
- wherein the saw is configured to translate laterally along an arcuate path relative to the first arm;
- wherein the wrap cutting assembly further comprises a saw housing fixedly mounted to the first arm and a linkage system comprising at least one pivot bar movably coupling the saw to the saw housing;
- wherein the saw comprises a saw plate and a plurality of teeth extending from an inner edge of the saw plate, wherein the linkage system is coupled to the saw plate, and
- wherein the saw plate and the plurality of teeth translate laterally along the arcuate path.

7. The bale wrap cutting and retaining apparatus of claim 6, further comprising:
- a first hydraulic actuation assembly for actuating the wrap cutting assembly, the first hydraulic actuation assembly comprising a first hydraulic cylinder coupled to the wrap cutting assembly; and
- a second hydraulic actuation assembly for actuating the wrap retaining assembly, the second hydraulic actuation assembly comprising a first hydraulic cylinder coupled to the wrap retaining assembly.

8. The bale wrap cutting and retaining apparatus of claim 7, further comprising a selector valve, wherein each of the first hydraulic actuation assembly and second hydraulic actuation assembly are coupled to the selector valve.

9. The bale wrap cutting and retaining apparatus of claim 8, further comprising an arm actuation device comprising a hydraulically-operated power cylinder configured to move at least one of the first arm and second arm between a lowered position and a raised position, the arm actuation device coupled to the selector valve.

10. The bale wrap cutting and retaining apparatus of claim 9, wherein the second hydraulic actuation assembly is operable simultaneously with the first hydraulic actuation assembly.

11. The bale wrap cutting and retaining apparatus of claim 6, wherein the first arm extends along a first side of the bay, the second arm extends along a second side of the bay, and the first arm and the second arm are substantially perpendicular to the frame.

12. The bale wrap cutting and retaining apparatus of claim 11, wherein the plurality of wrap retainers are spaced apart substantially along a length of the second arm.

13. The bale wrap cutting and retaining apparatus of claim 6,
wherein;
the wrap retaining assembly comprises a movable shuttle;
the plurality of wrap retainers comprises a plurality of hooks;
the wrap retainer comprises a retainer plate and the plurality of hooks; and
the retainer plate is rotatably coupled to the shuttle.

14. A method for using a bale wrap cutting and retaining apparatus comprising:
- providing the bale wrap cutting and retaining apparatus, the bale wrap cutting and retaining apparatus comprising a wrap cutting assembly and a wrap retaining assembly, the wrap cutting assembly comprising a saw movably coupled to a saw housing and configured to move along an arcuate path;
- engaging a bale with the bale wrap cutting and retaining apparatus at a bale site;
- laterally translating the saw along the arcuate path to cut a bale wrap of the bale; and
- retaining the bale wrap on at least one wrap retainer the wrap retaining assembly;
- wherein the saw comprises a saw plate and a plurality of teeth extending from an inner edge of the saw plate, and wherein the saw plate and the plurality of teeth translate laterally along the arcuate path.

15. The method of claim 14, further comprising removing the bale wrap from the bale site.

* * * * *